March 28, 1967
R. E. PECHACEK
3,311,253
RELEASABLE VESSEL COUPLING
Filed March 24, 1965
3 Sheets-Sheet 1
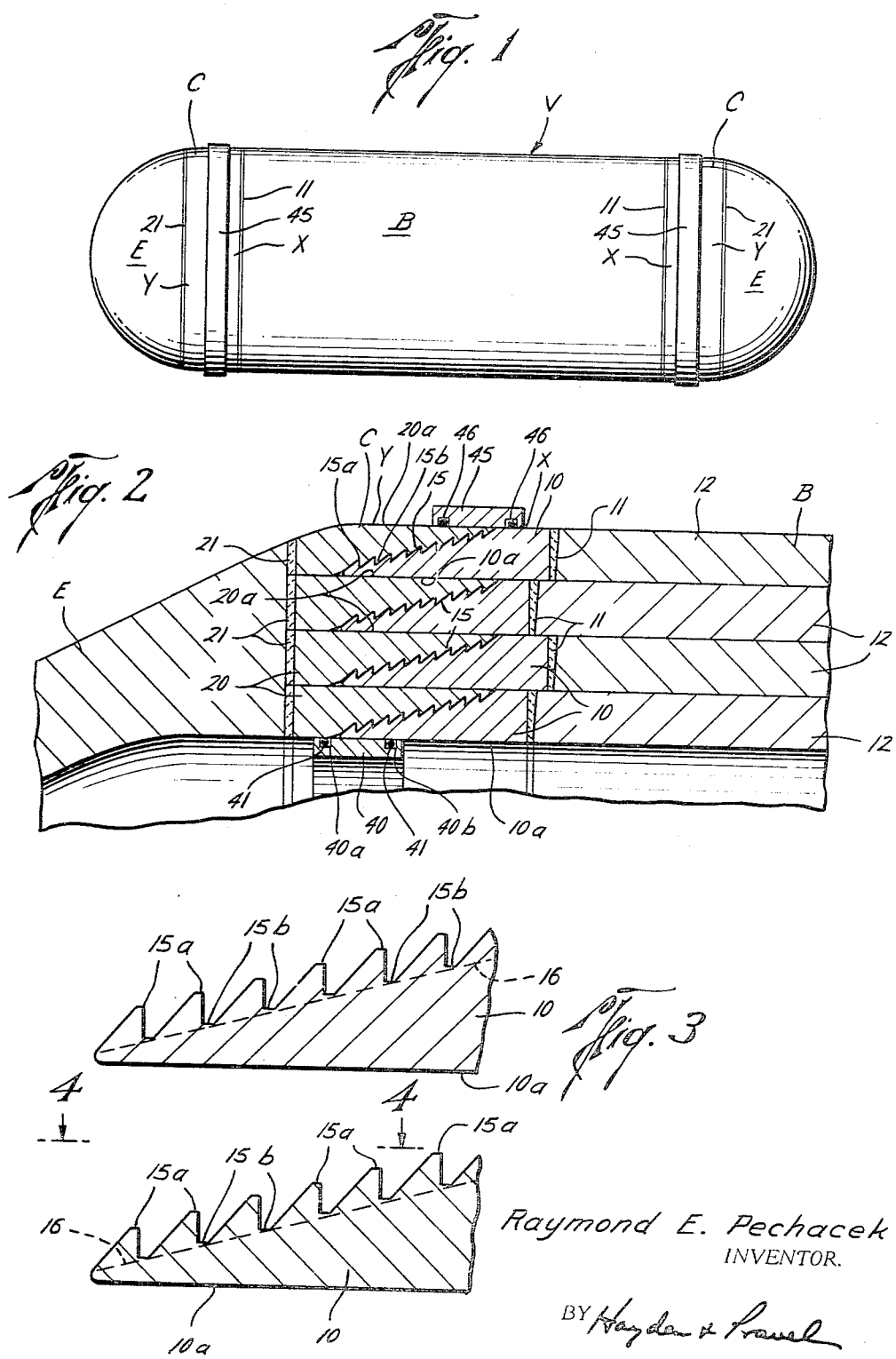
Raymond E. Pechacek
INVENTOR.
BY Hayden & Pravel
ATTORNEYS

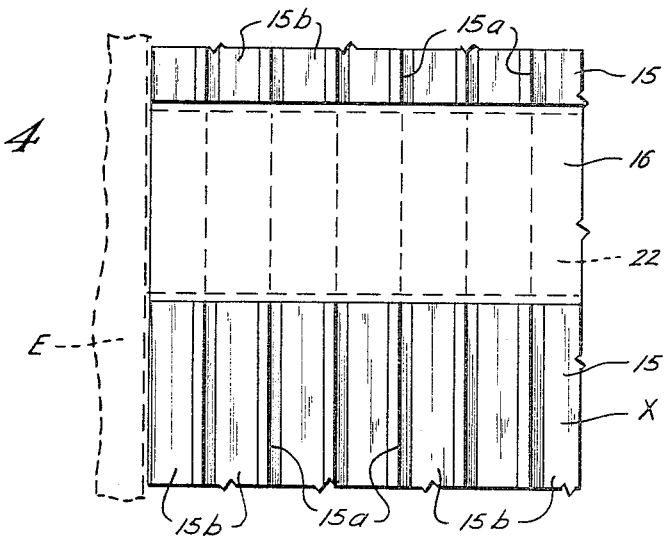
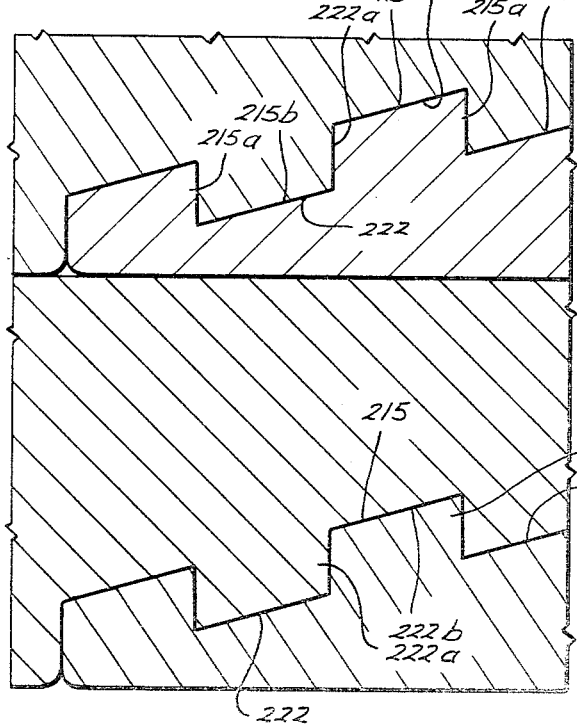
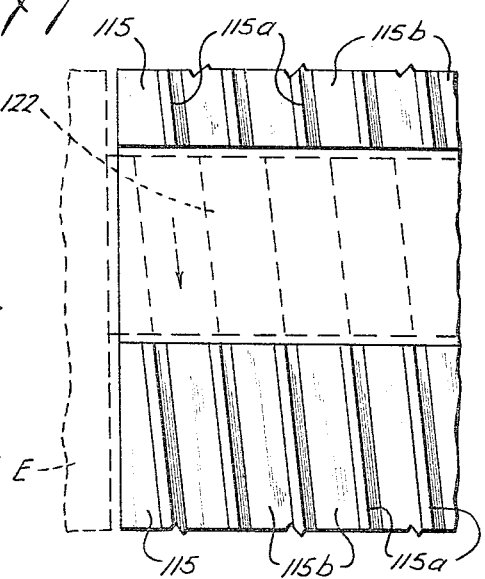
Raymond E. Pechacek
INVENTOR.
ATTORNEYS

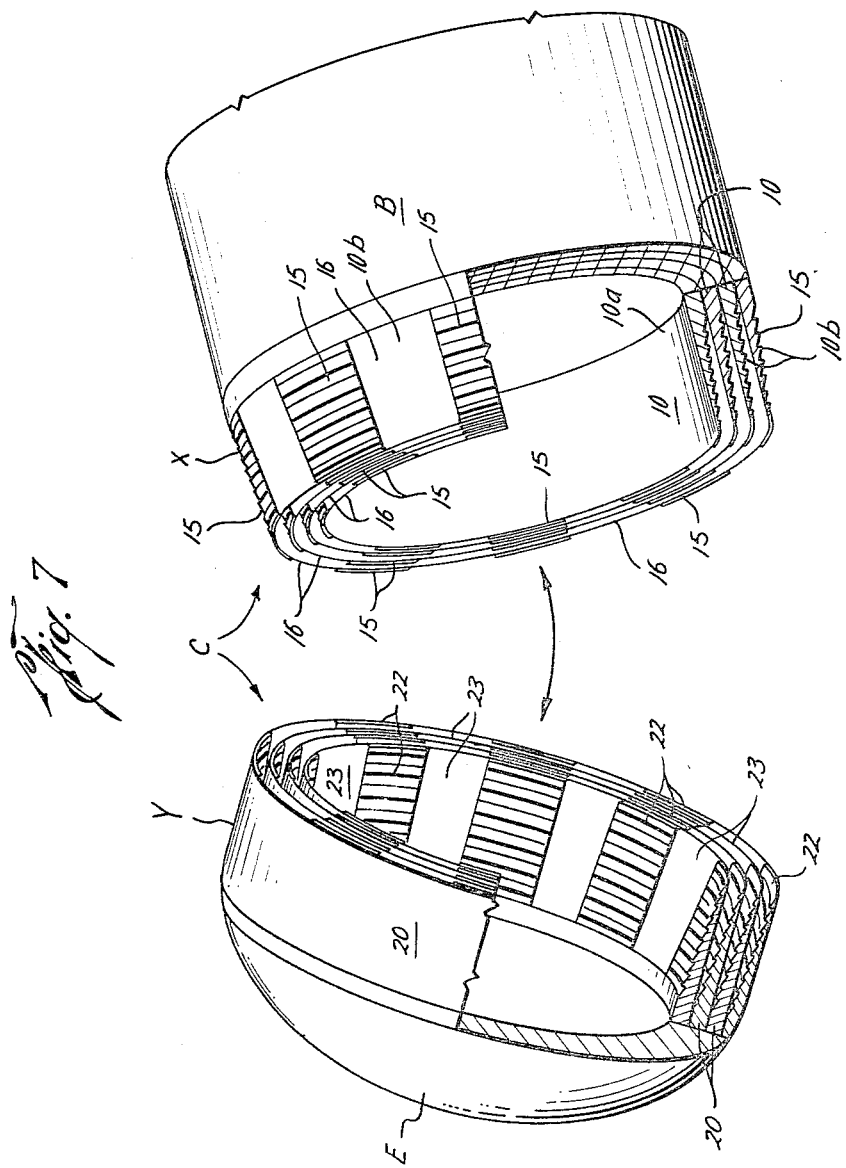

United States Patent Office 3,311,253
Patented Mar. 28, 1967

3,311,253
RELEASABLE VESSEL COUPLING
Raymond E. Pechacek, Houston, Tex., assignor to Hahn & Clay, Houston, Tex., a corporation of Texas
Filed Mar. 24, 1965, Ser. No. 442,362
6 Claims. (Cl. 220—3)

This invention relates to new and useful improvements in releasable vessel couplings.

It is not uncommon for conventional releasable couplings on pressure vessels to have a thickness which is four times the thickness of the vessel wall. Such conventional couplings are so constructed that they materially increase the outside diameter of the vessel, which is especially objectionable when the vessel is to be used in a limited space. Furthermore, conventional couplings generally employ mating bolted flanges so that the release of the coupling is laborious and time-consuming.

It is an object of the present invention to provide a new and improved releasable coupling for vessels which has the same, or substantially the same, thickness as that of the wall of the cylinder portion of the vessel so that the outside diameter of the coupling is the same, or substantially the same, as the outside diameter of the vessel cylinder wall.

An important object of this invention is to provide a new and improved releasable coupling for pressure vessels which eliminates bolts at the coupling while at the same time providing the necessary strength to withstand the pressures to which the vessel is subjected.

Another object of this invention is to provide a new and improved releasable coupling for vessels which is released by rotation of one part of the vessel such as the end closure relative to another part of the vessel such as the vessel cylinder.

A further object of this invention is to provide a new and improved releasable coupling for pressure vessels wherein the coupling includes a plurality of overlapping pairs of layers which resist endwise separation by an interlocking of projections and recesses on each pair of layers and which also serve to balance out bending moments between the pairs of layers.

Still another object of this invention is to provide a new and improved releasable coupling in which the stress lines on the coupling are in longitudinal alignment with the vessel wall and/or end closure to minimize bending moments acting on the coupling.

A particular object of this invention is to provide a releasable coupling having overlapping tapered segments with interrupted teeth or the like to obtain the strength of substantially the full thickness of the coupling, whereby maximum strength is provided with a minimum thickness at the coupling.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation illustrating the preferred form of the completed vessel utilizing the releasable coupling of this invention;

FIG. 2 is a vertical sectional view illustrating a portion of the preferred form of the releasable coupling of this invention;

FIG. 3 is an enlarged fragmentary sectional view illustrating the coupling teeth of the coupling of FIG. 2;

FIG. 4 is a partial plan view of a row of the teeth of one-half of the coupling of FIG. 2, with the view being taken on line 4—4 of FIG. 3;

FIG. 5 is a view similar to FIG. 4, but illustrating a modification thereof wherein the coupling teeth are formed as threads;

FIG. 6 is a fragmentary sectional view illustrating a modified form of the coupling of FIG. 2, wherein lugs and grooves are employed instead of the buttress teeth of the coupling of FIG. 2; and FIG. 7 is an exploded view with the end closure of the vessel separated from the vessel body to illustrate the construction of the releasable coupling sections.

In the drawings, the letter V designates generally a vessel with which one or more of the releasable couplings C of this invention are used. Although the vessel V may take numerous forms, the vessel V as illustrated in FIG. 1 is a pressure vessel having a vessel body or cylinder B with end closures E at each end thereof. As will be more evident hereinafter, the end closures E are each releasably connected to the vessel body or cylinder B by means of the releasable couplings C of the invention. As will be more evident hereinafter, the coupling C of this invention is of substantially the same thickness and external diameter as the wall of the vessel cylinder or body B and at the same time, such coupling C is releasable by a relative rotation of the end closure E and the vessel cylinder or body B.

Considering the invention more in detail, and particularly FIGS. 1–4 and 7, the releasable coupling C shown therein includes two coupling assemblies X and Y. Each of the coupling assemblies includes a plurality of concentric annular coupling sections of different diameters. Thus, as illustrated in particular in FIGS. 2 and 7, the coupling assembly X includes four annular coupling sections 10 which are welded or otherwise connected with the vessel cylinder or body B. The welds are shown at 11 in FIG. 2. It is to be noted that for purposes of illustration, the vessel cylinder B has been illustrated as being formed of a plurality of layers which is commonly called a multi-layer vessel cylinder. In such form, each of the layers 12 of the vessel cylinder B is shown as formed of the same thickness as the end sections of the coupling rings or sections 10 so as to form a continuation thereof as best seen in FIG. 2. Also, the ends of the layers 12 are shown as staggered with respect to each other in FIG. 2, but they may be in the same plane as shown in FIG. 7. If desired, the wall of the vessel cylinder or body B may be made of a single layer or any arrangement or thicknesses of multiple layers as desired.

Each of the coupling rings or annular sections 10 of the coupling assembly X is provided with an inner surface 10a of a cylindrical shape and of a uniform internal diameter. The external surface 10b of each of the coupling sections or rings 10 is tapered downwardly and outwardly as viewed in FIG. 2, with alternating coupling segments 15 and smooth metal sections 16 therebetween on such tapered external surfaces 10b.

In the form of the invention illustrated in FIGS. 2–4 and 7, the coupling segments 15 include buttress type teeth having projections 15a and recesses 15b between each of the projections 15a.

The coupling assembly Y is also formed with a plurality of concentric annular coupling sections or rings 20 which are adapted to mate and interlock with the coupling sections corresponding thereto on the coupling assembly X, as will be further explained. The coupling sections or rings 20 are welded at 21 or are otherwise connected to the end closure E so as to form an integral part thereof. Each of the annular coupling sections or rings 20 is formed with an upper or external cylindrical surface of uniform diameter 20a. Thus, as best seen in FIG. 2, when the coupling assemblies X and Y are assembled in locked relationship, the cylindrical surfaces of the innermost three coupling rings 20 are in engagement with the surfaces 10a of the three outermost rings or annular sections 10 (FIG. 2).

Each of the tubular coupling sections or rings 20 is formed with alternating coupling segments 22 and smooth metal sections 23 therebetween (FIG. 7). The width of the coupling segments 22 is the same as the width of the coupling segments 15. The smooth portions 16 and 23 are approximately in the same plane as the roots of the teeth 15 and 22, respectively, so as to provide spaces thereabove. The width of the spaces above the smooth portions 16 and 23 is the same. Such spaces above the surfaces 16 and 23 are of a greater width than the segments 15 and 22 for interlocking upon rotation, as will be more evident hereinafter.

The projections and recesses forming the teeth for the coupling segments 22 are formed in an identical manner to the teeth on the coupling segments 15, but reversed in direction so as to interlock as illustrated in FIG. 2 in particular. In FIG. 4, a portion of the coupling assembly X is illustrated in solid lines, with a coupling segment 22 shown in dotted lines disposed in the space 16 between an adjacent pair of coupling segments 15, thereby illustrating the relative positions of the coupling segments 15 and 22 upon an initial engagement of the coupling assemblies X and Y, but prior to rotation to the locked position of FIG. 2. It is to be noted that the width of the space above the smooth portion 16 on the coupling ring 10 in FIG. 4 is greater than the width of the coupling segment 22 to permit the connection of the assemblies X and Y. At the same time as the segments 22 are disposed in the spaces above the surfaces 16, the segments 15 are disposed in the spaces above the surfaces 23 and therefore they are in position for a relative rotation of the end closure E with respect to the vessel cylinder or body B. After such relative rotation, the segments 22 and 15 are aligned radially with each other and are interlocked by reason of the inter-engagement of the projections within the recesses of the opposing segments as best seen in FIG. 2. The spaces or tapered smooth surfaces 16 and 23 are then also aligned radially with each other in such interlocked position.

To provide a fluid seal so that fluid from within the vessel V does not escape through the small spaces provided at the smooth tapered surfaces or spaces above the surfaces 16 and 23, an internal seal ring 40 (FIG. 2) is provided having a sufficient width to bridge the gap between the innermost coupling sections or rings 10 and 20. In one form of the invention, the ring 40 is formed of steel or similar material and is provided with annular grooves 40a and 40b in which annular seal rings 41 formed of rubber or other similar material and commonly called O-rings are disposed. Such seal rings 41 thus prevent any fluid from escaping from the inside of the vessel to a point externally thereof. Also, there is a slight bending moment exerted on the innermost ring 10 when a relatively high pressure is developed with the vessel V. Such bending moment is caused by the longitudinal forces acting on the end closures which tends to bend the lower left end of the innermost ring 10 downwardly or inwardly. The steel ring 40 provides a support to resist such bending moment and increase the strength of the entire coupling C. In some instances, the right-hand portion of the ring 40 may be welded to, or made integrally with, the innermost ring 10 so that the seal ring 41 in the groove 40b may be eliminated, but leaving the seal ring 41 in the groove 40a.

For increasing the strength of the coupling C, an external band 45 which is formed of steel or other similar material surrounds the outermost ring 20. Such band 45 may be welded to, or formed integrally with, such outermost ring 20, and if desired, the band 45 may also extend over to the outermost layer 10, as shown in FIG. 2. Although not usually necessary, O-rings 46 may be mounted on the band 45 in sealing engagement with the external surfaces of the outermost rings 10 and 20 (FIG. 2). Such ring 45 primarily serves to resist any bending moment by the ring 40 on the innermost coupling section 10.

In the operation or use of each of the couplings C illustrated in FIG. 1, the end closure E is positioned with respect to the vessel cylinder or body B so that the coupling segments 22 are aligned with the spaces above the smooth tapered surfaces 16, and at the same time, the coupling segments 15 are aligned with the spaces above the smooth tapered surfaces 23. The end closure E is then moved longitudinally with respect to the vessel cylinder B to cause the respective segments 22 to slide in between the segments 15 on each of the rings 10 and 20. Thereafter, the end closure E is rotated relative to the vessel cylinder B, or if desired, the vessel cylinder B is rotated with respect to the end closure E, so that the teeth on the segments 16 and 22 become interfitted and interlocked as illustrated in FIG. 2 of the drawings.

The ring 40 is in position within or is integral with the innermost ring 10 prior to the interfitting of the coupling assemblies X and Y. If the ring 45 is not integral with the outermost ring 20, it is slipped longitudinally over such outermost ring 20 and may bridge the gap between the outermost rings 10 and 20 to provide the seal as heretofore explained.

Should it be desired to release the end closure E from the vessel cylinder or body B, the reverse procedure is performed to that explained above for the assembly or connection of the coupling C. Thus, by simply rotating the end closure E relative to the body B, so as to position the coupling segments 22 in alignment with the surfaces 16 and the coupling segments 15 in alignment with the surfaces 23, the coupling C may be released and the parts E and B separated longitudinally from each other.

It is to be noted that by providing the interlocking arrangement with the plurality of layers or rings 10 and 20, a distribution of the bending moments as between such layers 10 and 20 reduces the bending moments on the outermost layer or ring 20 and the innermost layer or ring 10. For example, any tendency of the innermost ring 20 to bend upwardly by forces acting thereon are counteracted by the opposite forces acting on the second to the innermost layer or ring 10. In each case, wherein the fingers or layers 10 and 20 are adjacent to each other, the bending moments acting thereon which might otherwise tend to separate their interlocking teeth balance each other and thereby minimize any bending moments at the couplings C.

It should also be noted that the thickness of each of the fingers or layers 10 and 20 increases in the direction in which the loading or stress on their respective teeth or projections increases. Thus, as each finger 10 is viewed in FIG. 3, it will be appreciated by those skilled in the art that the loading on the teeth 15a due to internal pressure within the vessel V gradually increases from the first tooth 15a on the extreme left to the tooth 15a on the extreme right since the loads applied to each tooth are successively additive. Since the thickness of each layer 10 increases proportionately to such successive or gradual loading of the teeth 15a, the strength to support the loading is thus advantageously provided.

Another advantage of the present invention is due to the thinness of each finger or layer, since the load on each tooth or projection is distributed to a larger area as compared to teeth which may be formed on a large mass. Such increased distribution is especially valuable in the event two adjacent interlocking teeth are slightly out of alignment and engage each other before the other teeth in the particular series, since such increased load distribution prevents a concentration or localizing of all of the stress at those two teeth and instead the load is distributed to the body portion of each layer adjacent each of the two teeth.

It should further be noted that the portions 16 and 23 also take a portion of the load applied to the teeth sections 15 and 22, respectively, on each side thereof, and such loading on the portions 16 and 23 increases from the thinnest to the thickest part of each layer 10 (from left to right on the portions 16 and from right to left on the portion 23 in FIG. 7), which is highly desirable since the loading on the teeth increases in the same direction.

Although the teeth of the coupling segments 15 and 22 have been illustrated as of the buttress type in FIGS. 2–4 and 7, such teeth may take different shapes, two other forms of which are illustrated in FIGS. 5 and 6. Thus, in FIG. 5, the coupling segments 115 are illustrated which are in the form of buttress threads which are identical with the buttress teeth 15 of FIGS. 1–4 and 7, except that the threads on the segments 115 are helically disposed. Also, the corresponding coupling segments 122 shown in dotted lines in FIG. 5 have corresponding helically disposed threads which are adapted to interengage with the helically disposed threads 115. The projections 115a of the threads 115 are indicated in FIG. 5 as well as the recesses or grooves 115b therebetween. In connecting the sections of the modified coupling of FIG. 5, the same procedure is used as described above in connection with FIGS. 1–4 and 7, but it will be observed that the helical angle of the threads on the segments 115 and 122 causes a longitudinal inward movement of the end closure E with respect to the body B as the relative rotation of the end closure E is produced with respect to the body B.

FIG. 6 is an enlarged view illustrating portions of modified coupling segments 215 and 222. The segments 215 and 222 are provided with mating lugs and grooves rather than the buttress teeth of FIGS. 2–4 and 7. Thus, the segments 215 have lugs 215a and recesses or grooves 215b therebetween. The segments 222 have lugs 222a and grooves or recesses 222b therebetween. The connection of such lugs and grooves for the segments 215 and 222 is believed to be self-evident from FIG. 6 in view of the fact that they are connected and assembled in the same manner as heretofore described in connection with FIGS. 1–4 and 7.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A releasable coupling for a vessel or the like having a pair of parts each of which has an annular end portion, comprising:
   (a) a first coupling assembly having a plurality of concentric annular coupling sections of different diameters on the end of one of said parts of the vessel,
   (b) a second coupling assembly having a plurality of concentric annular coupling sections of different diameters on the end of the other of said parts of the vessel,
   (c) each of said coupling sections in the first and second assemblies having a plurality of circumferentially spaced coupling segments with a space between adjacent segments,
   (d) the width of the space between the segments being sufficient to receive the segments on the opposite part prior to a relative rotation of the two assemblies to align the segments in locking position,
   (e) interlocking projections and recesses on the segments of the two assemblies for releasably locking the assemblies and the two parts of the vessel together when the segments are aligned in locking position,
   (f) the projections and recesses on the annular coupling sections of the first coupling assembly being disposed on the outer surfaces of each such section,
   (g) the projections and recesses on the annular coupling sections of the second coupling assembly being disposed on the inner surfaces of each such section,
   (h) the inner surfaces of each annular coupling section of the first coupling assembly being substantially cylindrical,
   (i) the outer surfaces of each annular coupling section of the second coupling assembly being substantially cylindrical, and
   (j) the inner surfaces of the first coupling assembly and the outer surfaces of the second coupling assembly which are adjacent to each other being disposed substantially in contact with each other when said interlocking projections and recesses are locked together, whereby bending moments on the coupling sections are substantially balanced out except at the innermost coupling section and outermost coupling section.

2. The structure set forth in claim 1, wherein:
   (a) the adjacent surfaces on at least two of the annular coupling sections are tapered at substantially the same angle relative to the longitudinal axis of said sections.

3. The structure set forth in claim 1, wherein:
   (a) all of the adjacent surfaces on the annular coupling sections having the projections and recesses thereon interfit and are tapered relative to the longitudinal axis of said sections to provide maximum strength with a minimum wall thickness at the coupling.

4. The structure set forth in claim 1, including:
   (a) a support ring disposed internally of the innermost annular coupling section in a position to support such section and counteract any inward bending moment occurring in such coupling section.

5. The structure set forth in claim 1, including:
   (a) seal means disposed for sealing off the junction between the two coupling assemblies to prevent the escape of fluid under pressure through the coupling.

6. The structure set forth in claim 1, including:
   (a) a support ring disposed internally of the innermost annular coupling section in a position to support such section and counteract any inward bending moment occurring in such coupling section,
   (b) said support ring spanning the junction between the innermost coupling section on each of the two coupling assemblies, and
   (c) seal means with said support ring for sealing off said junction to prevent the escape of fluid under pressure through the coupling.

References Cited by the Examiner

UNITED STATES PATENTS

| 821,331 | 5/1906 | Blood | 89—20 |
| 1,958,582 | 5/1934 | Kerr et al. | 220—3 |
| 2,685,382 | 8/1954 | Cornelius | 220—3 |
| 2,811,337 | 10/1957 | Anderson | 220—46 |

FOREIGN PATENTS

| 22,398 | 1910 | Great Britain. |

THERON E. CONDON, *Primary Examiner.*

RAPHAEL H. SCHWARTZ, *Examiner.*